United States Patent [19]

Kakizawa

[11] Patent Number: 4,996,708
[45] Date of Patent: Feb. 26, 1991

[54] KEY TELEPHONE SYSTEM ADAPTED TO RESPOND TO INFORMATION STORED IN A PORTABLE OUTPULSER

[75] Inventor: Katsuhiro Kakizawa, Kawasaki, Japan

[73] Assignee: Canon Kabushiki Kaisha, Tokyo, Japan

[21] Appl. No.: 389,981

[22] Filed: Aug. 7, 1989

[30] Foreign Application Priority Data

Aug. 9, 1988 [JP] Japan .................. 63-197179

[51] Int. Cl.⁵ .............................................. H04M 1/26
[52] U.S. Cl. .................. 379/156; 379/165; 379/216; 379/361
[58] Field of Search ............. 379/156, 40, 51, 165, 379/216, 286, 361

[56] References Cited

U.S. PATENT DOCUMENTS 4,126,768 11/1978 Grenzow ........................... 379/361
4,644,107 2/1987 Clowes et al. .................. 379/216 X Primary Examiner—Stafford D. Schreyer
Attorney, Agent, or Firm—Fitzpatrick, Cella, Harper & Scinto

[57] ABSTRACT

There is provided a key telephone system for transmitting and receiving a dial number by a peculiar control signal between a main unit and an extension telephone. The system comprises: an extension telephone; a main unit; an analyzing unit for analyzing an audio signal; and a calling unit for calling in accordance with the result by the analysis of the analyzing means. The calling unit generates a dial pulse. When a calling request from the extension telephone is detected, the main unit connects the extension telephone and the analyzing unit. Information generated by an electronic apparatus via which the dial number can be independently registered from an extension telephone of the KTs is analyzed and calling or displaying can be executed.

54 Claims, 8 Drawing Sheets

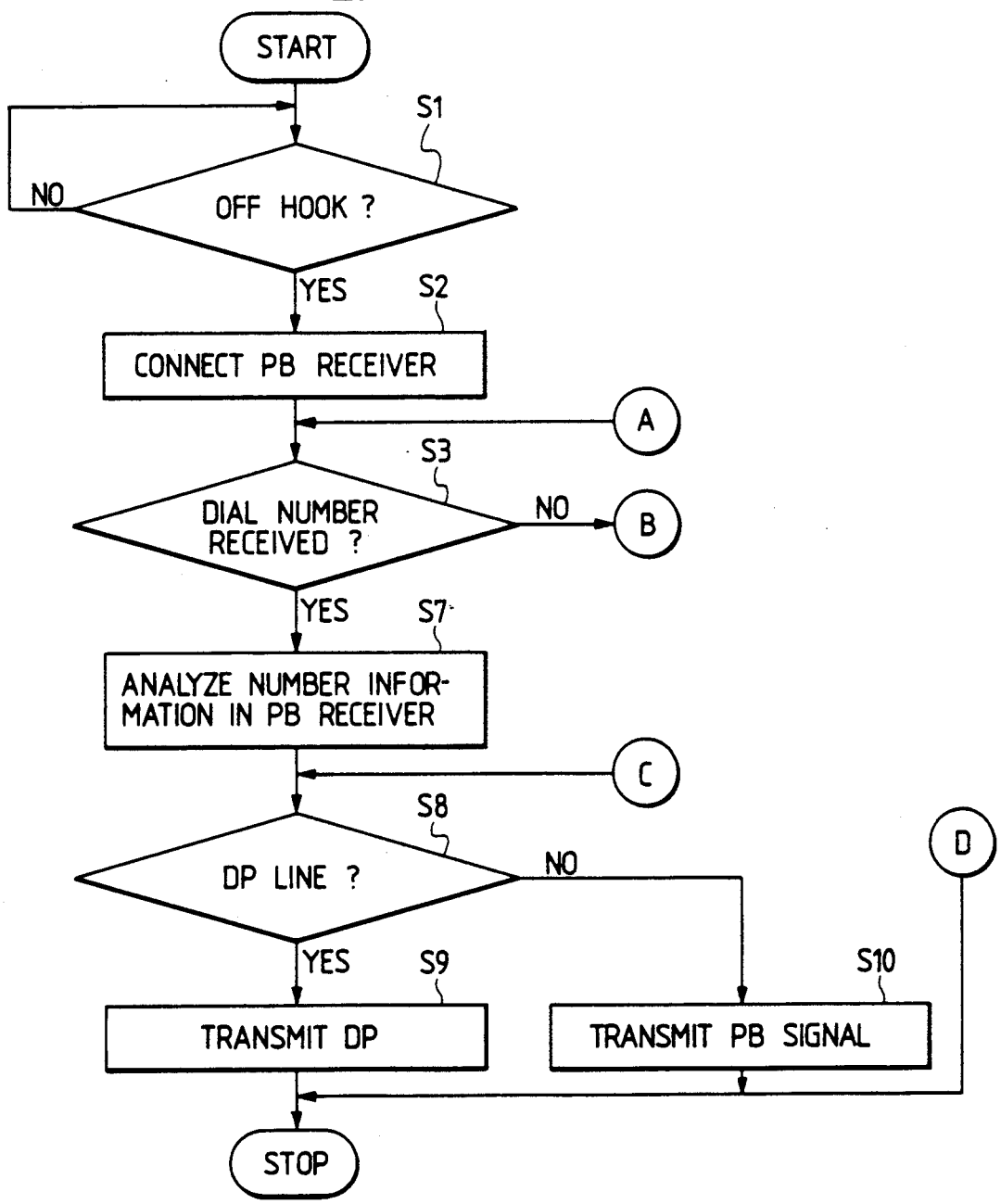

KEY TELEPHONE SYSTEM ADAPTED TO RESPOND TO INFORMATION STORED IN A PORTABLE OUTPULSER

BACKGROUND OF THE INVENTION

1. Field of the Invention

The present invention relates to a key telephone system in which a dial number is transmitted and received between a main unit and an extension telephone apparatus by a peculiar control signal.

2. Related Background Art

Hitherto, in the key telephone system (KTS), an extension telephone converts the input dial number, into a control signal of a predetermined format and sends the signal to an extension circuit in a main unit.

In the main unit, the dial number received by the extension circuit is transmitted by a trunk circuit in a form of a dial pulse or a PB signal in accordance with the contract with a telephone company.

On the other hand, portable electronic apparatuses which can store and read out various information (additional valuable information such as schedule, telephone number, address, etc.) for use at any time have been put into practical use as manufactured articles. Among such apparatuses, there is also an apparatus (automatic dialer) in which by indicating a registered telephone number, a PB signal of the indicated telephone number can be generated as a sound from an audio output unit such as a speaker or the like. Therefore, by speech transmitting the generated PB signal from a mouthpiece of the telephone to the line, the telephone number can be dialed to the distant partner side. In association with the wide spread of electronic apparatuses having such an auto-dialing function, users' demand for the ability, even in the extension telephone of the KTS, to use the auto-dialing function in a manner similar to a common, ordinary telephone has become stronger and stronger.

However, in the above conventional apparatus, since the dialed number is transmitted and received between the extension telephone and the main unit by means of a control signal which is peculiar to the KTS, there is the problem that it is impossible to call by using an electronic apparatus which transmits the dial number by oscillating a PB signal.

SUMMARY OF THE INVENTION

It is an object of the present invention to improve operability for calling from an extension telephone of the KTS.

Another object of the invention is to provide a KTS in which information generated by an electronic apparatus in which a dial number can be independently registered from an extension telephone is analyzed and the calling or displaying is performed.

Still another object of the invention is to enable a dial signal to be transmitted as an audio signal from an extension telephone to a main unit.

Further another object of the invention is to enable a telephone to take a necessary process according to an inputting method of a dial number.

Further another object of the invention is to provide a KTS in which in the case where it is impossible to call by using an electronic apparatus in which a dial number can be independently registered from an extension telephone, such a fact is informed to an operator.

The above and other objects and features of the present invention will become apparent from the following detailed description and the appended claims with reference to the accompanying drawings.

DETAILED DESCRIPTION OF THE INVENTION

First Embodiment

The embodiment comprises: a main unit which is connected to a telephone line; and an extension telephone which transmits and receives dial number information based on a peculiar control signal through the main unit.

Figure 1:
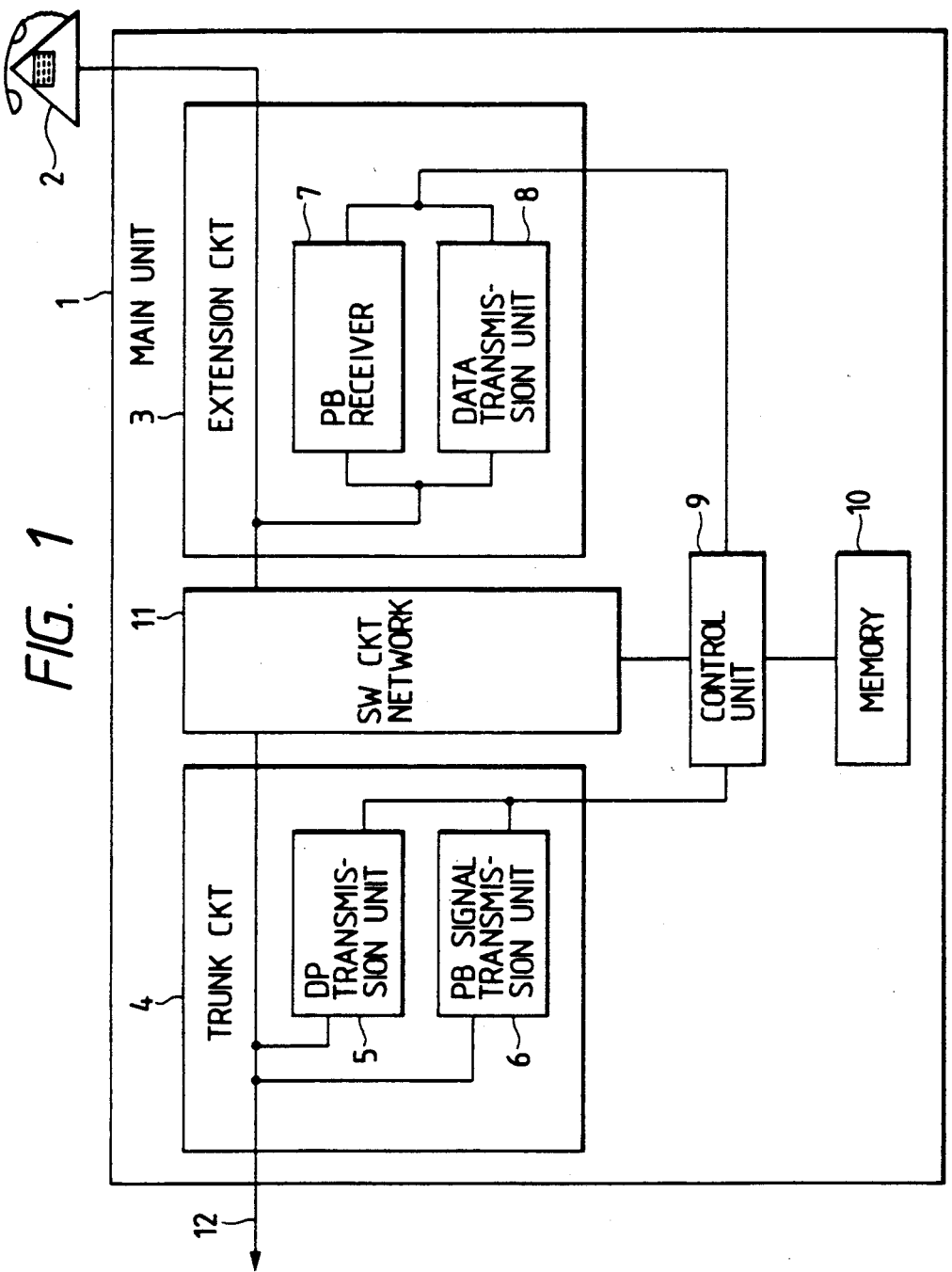
FIG. 1 is a block diagram of a main unit in the first embodiment of the present invention.

FIG. 1 is a block diagram for explaining a construction of a button telephone apparatus showing an embodiment of the invention. Reference numeral 1 denotes a main unit comprising a trunk circuit 4, a switch circuit network 11, an extension circuit 3, and the like, connected to a telephone line 12. The main unit 1 integrally controls signal transmission from or to the extension telephone 2.

The trunk circuit 4 has: a dial pulse (hereinafter abbreviated as a DP) transmission unit 5 to transmit a dialed number to the telephone line 12 by a dial pulse signal; and a push button (hereinafter, abbreviated as a PB) signal transmission unit 6 to transmit a dial number to the telephone line 12 by a PB signal. Reference numeral denotes a PB receiver for receiving an external PB signal, for instance, an external PB signal which is transmitted from an apparatus which generates a PB signal.

Reference numeral 8 denotes a data transmission unit for transmitting and receiving a control signal to and from the extension telephone 2. Reference numeral 10 indicates a memory in which data with respect to the extensions and lines is stored. The switch circuit network 11 switches to control the connection/disconnection the extension or line.

When an external PB signal is transmitted to the mouthpiece of the extension telephone 2, the PB receiver 7 receives the transmitted external PB signal and transmits and receives the dial number information. At this time, the control unit 9 discriminates the type of telephone line 12 to see if it is the dial pulse signal type or the PB signal type, and selects the DP transmission unit 5 or PB signal transmission unit 6 accordingly. If the telephone line 12 is of the dial pulse signal type, the DP signal corresponding to the external PB signal received by the control unit 9 is sent from the dial pulse transmission unit 5 to the telephone line 12. On the other hand, if the telephone line 12 is of the PB signal type, the external PB signal received by the control unit 9 is sent from the PB signal transmission unit 6 to the telephone line 12.

The dial number transmitting process according to the present invention will now be described with reference to FIG. 2.

Figure 2B:
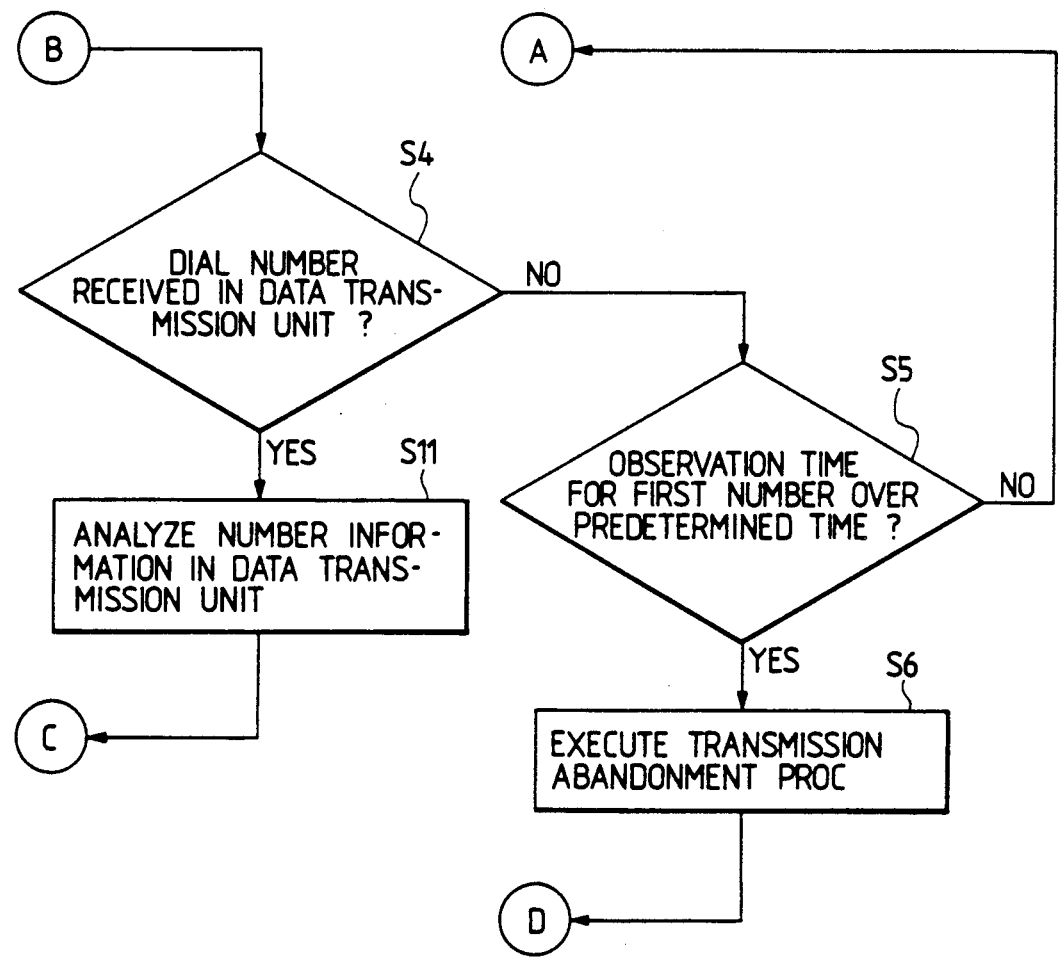
FIG. 2, consisting of FIGS. 2A and 2B, is a flowchart for a dial number transmission processing procedure in the first embodiment of the invention.

FIG. 2 is a flowchart for explaining an example of the dial number transmission processing procedure according to the invention. S1 to S11 indicate processing steps.

First, the control unit 9 checks to see if the extension telephone 2 has called (is off hook) or not through the extension circuit 3 (S1). If YES, the PB receiver 7 in the extension circuit 3 is connected to a speech line of the extension telephone 2 in accordance with a command from the control unit 9 (S2). Next, the control unit 9 checks to see if a dialed number has been received or not (S3). If NO, a check is made to see if a dialed number has been received by the data transmission unit 8 or not (S4). If NO in step (S4), a check is made to see if the checking operation has been continued for a predetermined time or not (S5). If NO in step (S5), the processing routine is returned to step (S3). If YES in step (S5), it is assumed that the user abandoned the transmission during the operation and a transmission abandonment process to transmit a notice sound or the like is executed (S6). Then, the processing routine is finished.

On the other hand, if YES in step (S4), a process to analyze the dialed number information transmitted is executed in the data transmission unit 8 (S11). Then, step (S8) follows.

On the other hand, if YES in step (S3), a process to analyze the dial number information transmitted is executed in the PB receiver 7 (S7). Then, step (S8) follows.

In step (S8), the control unit 9 checks to see if the telephone line 12 is of the DP line type or not. If YES in step (S8), a dial pulse signal is sent to the telephone line 12 (S9) and the processing routine is finished. If NO in step (S8), a PB signal is sent to the telephone line 12 (S10) and the processing routine is finished.

The above embodiment has been described with respect to the case where the PB receiver 7 is provided on the extension circuit 3 corresponding to the extension telephone 2. On the other hand, it is also possible to construct the apparatus in a manner such that the PB receiver 7 is enclosed in the switch circuit network 11 independently of the extension circuit 3 and the PB receiver 7 is connected to the extension circuit 3 through the switch circuit network 11.

On the other hand, it is also possible to construct the apparatus in a manner such that a switch is further provided on the extension telephone 2 and information indicating whether the automatic dialer is used or not is provided to the main unit 1 by depressing the switch. In this case, if the automatic dialer is used, it is also possible to construct the apparatus such that the operator depresses the switch and when the control unit 9 detects the depression of the switch, the PB receiver 7 is connected. Or, if the telephone line 12 is of the PB signal type, the trunk circuit 4 and extension circuit 3 are connected through the switch circuit network 11 and the external PB signal from the automatic dialer can also be directly transmitted to the telephone line 12 through the trunk circuit 4.

Further, it is also possible to construct the apparatus in a manner such that the PB receiver 7 is provided in the extension telephone 2, and in the extension telephone 2, the dialed number information of the external PB signal is converted into the dialed number information similar to the input of the dial key which is peculiar to the extension telephone 2 and is transferred to the data transmission unit 8.

As described above, since the embodiment has the construction to analyze the external PB signal transmitted to the mouthpiece of the extension telephone, the auto-dialing function can also be used from the extension telephone irrespective of the general subscriber's telephone and the one-touch dialing process can be remarkably extended.

On the other hand, the automatic dialer which can be used by only the telephone line having the line contract to execute the PB signal process can also be used by a telephone line from an extension telephone which is a button telephone and which has the line contract for executing the dial pulse signal process There is an excellent effect that the dialing process can be extremely simplified or the like.

Second embodiment

Figure 3:
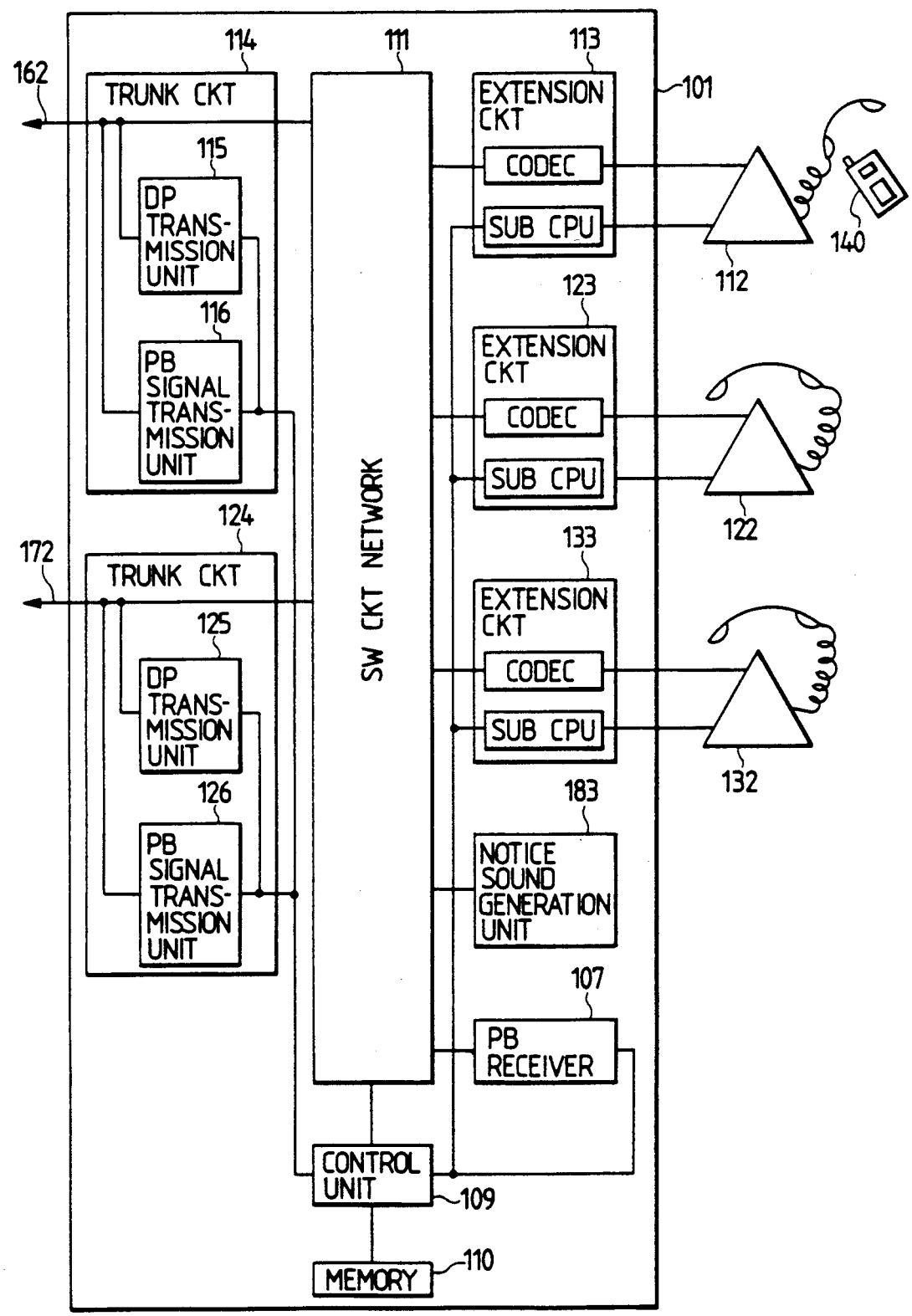
FIG. 3 is a block diagram of a main unit in the second embodiment of the invention.

FIG. 3 is a block diagram showing a construction of the second embodiment of this invention. In the embodiment, a PB receiver 107 is commonly used by a plurality of extension circuits 113, 123, and 133.

Reference numeral 101 denotes a main unit. A plurality of extension telephones 112, 122, and 132 and a plurality of external lines 162 and 172 are connected to the main unit 101. Reference numerals 113, 123, and 33 denote the extension circuits which are provided in corresponding to the extension telephones 112, 122, and 32, respectively. Each of the extension circuits 113, 23, and 133 has a code for encoding and decoding an audio signal and a sub-CPU for transmitting and receiving a control signal between the extension telephone and a control unit 109. The extension telephone and the extension circuit are connected through a speech line for communicating the audio signal and a control line for communicating the control signal. The code in the extension circuit encodes the analog audio signal from the extension telephone and sends the result to the switch circuit network 111, while the code decodes the digital, audio signal from the switch circuit network and sends the result to the extension telephone. Reference numerals 114 and 124 denote trunk circuits provided in correspondence to the external lines 162 and 172, respectively. The trunk circuits 114 and 124 have DP transmission units 115 and 125 for transmitting dial pulses to the external line and PB signal transmission units 116 and 126 for transmitting PB signals. The switch circuit network 111 is provided to control exchange of the external lines 162 and 172 and the extension telephones 112, 122, and 132 and of the extension speech communication of the extension telephones 112, 122, and 132. Reference numeral 107 denotes the PB receiver for receiving and analyzing the PB signal; 183 indicates a notice sound generation unit to generate a notice sound; 109 the control unit for controlling each section in the main unit on the basis of the information registered in a memory 110; and 140 an electronic apparatus for calling a desired partner by generating a PB tone. The electronic apparatus 140 is called an automatic dialer or an electronic telephone directory.

Figure 4:
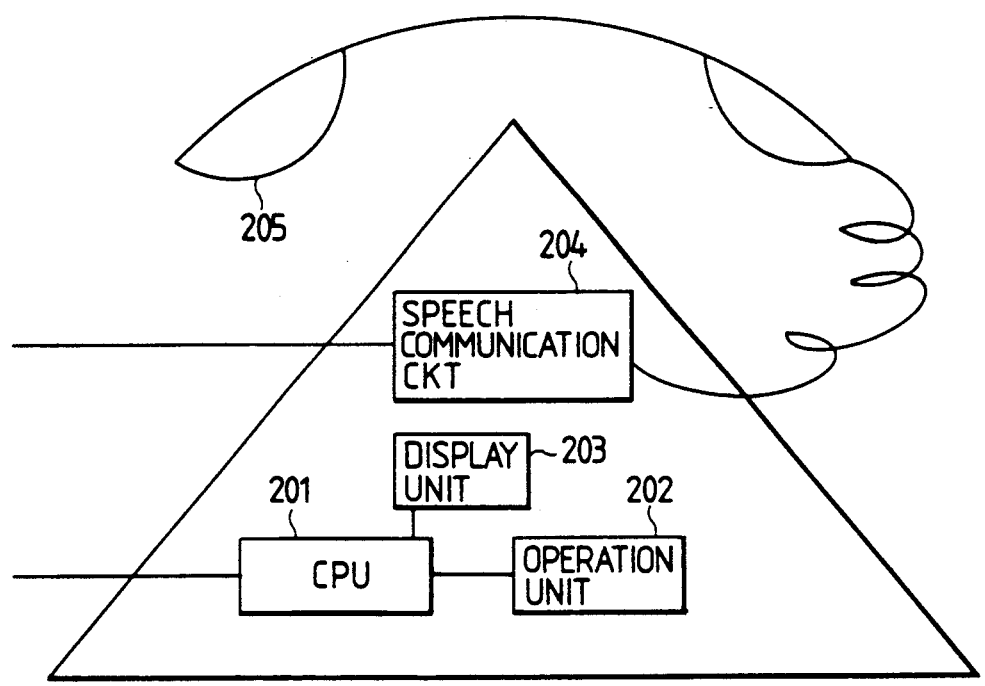
FIG. 4 is a block diagram of an extension telephone in the second embodiment of the invention.

FIG. 4 shows a construction of each of the extension telephones 112, 122, and 132 in the embodiment. Reference numeral 201 denotes a CPU for transmitting a control signal corresponding to the operation of an operation unit 202 or the on/off operation of a hook switch to a sub-CPU in the extension circuit. The CPU 201 also controls a display unit 203 or a not-shown bell (or buzzer) in accordance with the control signal received from the sub-CPU or the operation of the operation unit 202. Reference numeral 203 denotes the display unit to display a telephone number or the like and 204 indicates a speech communication circuit for adjusting the level of the voice sound input from a speech transmission unit 205 of the handset to a proper level and transmitting to the extension circuit and for adjusting the level of the audio signal received from the extension circuit to a proper level and sending to the receiver unit of the handset.

Figure 5:
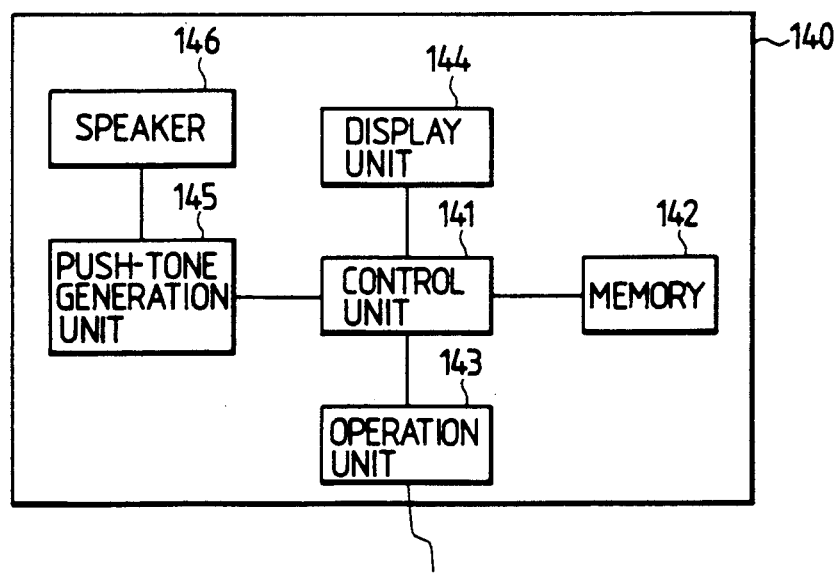
FIG. 5 is a block diagram of an electronic apparatus in the second embodiment of the invention.

FIG. 5 is a block diagram showing a construction of the electronic apparatus 140 in the present embodiment. A control unit 141 registers the name and telephone number of a desired speech communication partner in a memory 142, and further, reads out the telephone number from the memory 142 and displays it on a display unit 144 and outputs it as a sound from a speaker 146 through a push-tone generation unit 145 in accordance with the operations of an operation unit 143.

In the construction shown in FIG. 5, in the case of registering the name and telephone number, the operator registers the name into the memory 142 by using alphabet keys in the operation unit 143 and registers the telephone number by using ten keys in the operation unit 143. In this manner, a plurality of sets of names and telephone numbers have previously been registered in the memory 142.

In the construction shown in FIG. 5, in the case of calling, the operator selects a desired name by operating the alphabet keys in the operation unit 143 or a search key to read out the next name in accordance with the alphabetical order, while observing the display content on the display unit 144. During the above operations, the control unit 141 reads out the name and telephone number from the memory 142 in accordance with the depression of the alphabet keys or search key and displays what is read out on the display unit 144. When the operator depresses a calling key in the operation unit 143, the control unit 141 sends the telephone number displayed on the display unit 144 to the push-tone generation unit 145. The push-tone generation unit 145 generates a push-tone corresponding to the telephone number received from the control unit 141.

Figure 6:
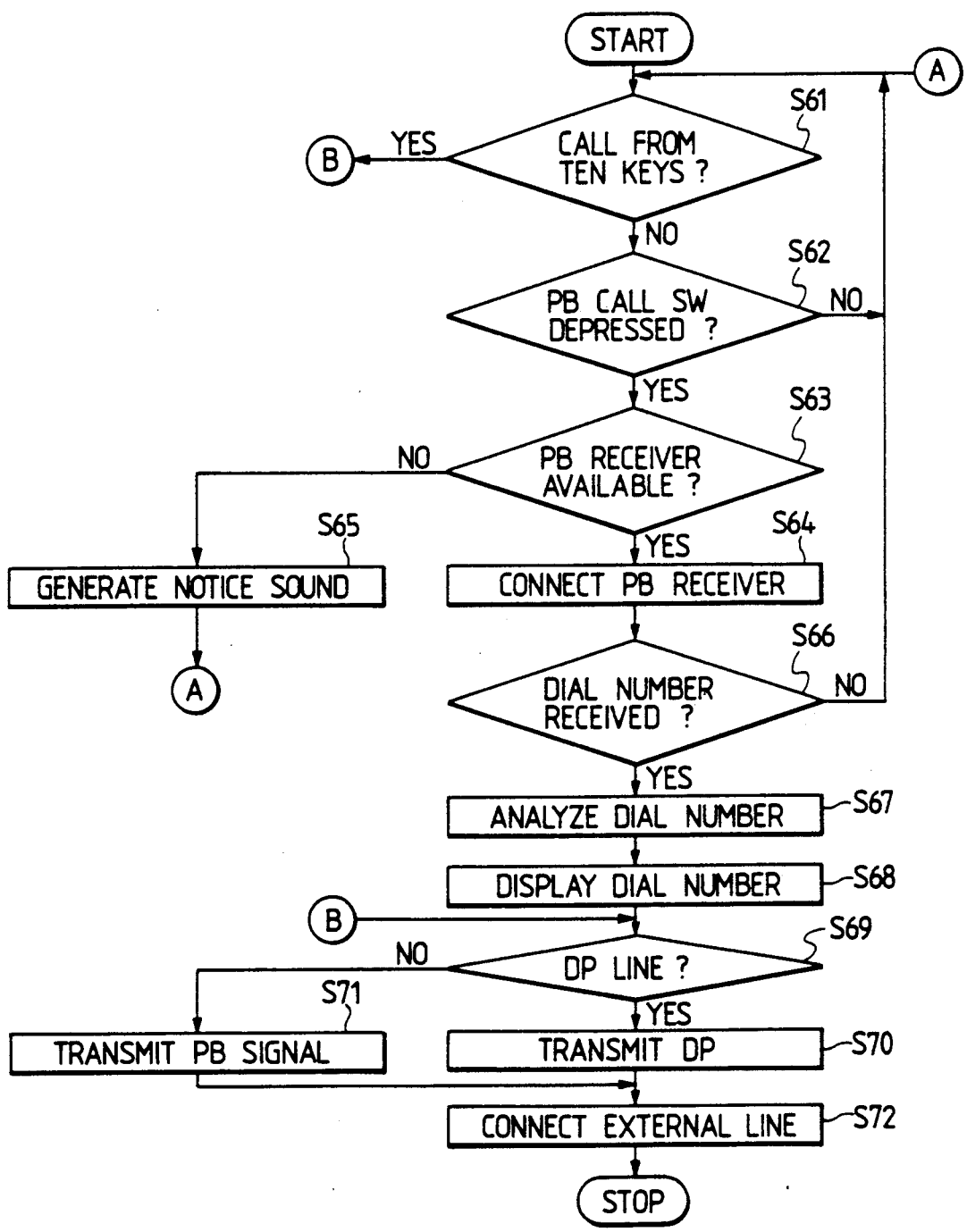
FIG. 6 is a flowchart for a dial number transmission processing procedure in the second embodiment of the invention.

FIG. 6 shows a flowchart showing the operation in this embodiment.

The control unit 109 checks to see if the dial number has been input from the ten keys in the operation unit 202 of the extension telephone or not (step S61) and also checks to see if a PB calling switch in the operation unit 202 has been pressed or not (step S62). In the case where the operator calls by using an electronic apparatus having the function to generate a push-tone as shown in FIG. 5, the operator presses the PB calling switch in the operation unit 202 prior to generating the push-tone. On the other hand, the external line 162 or 172 is selected by pressing an external line selecting button in the operation unit 202.

Since a plurality of extension telephones are connected to the main unit 101, the control unit 109 sequentially checks to see if the operations have been executed in the plurality of extension telephones 112, 122, and 132 or not.

In step S62, when the depression of the PB calling switch has been detected, the control unit 109 checks to see if the PB receiver 107 has already been used by another extension telephone or not (step S63). If the PB receiver 107 is available (namely, YES) in step S63, the control unit 109 controls the switch circuit network 111 and connects the extension telephone whose PB calling switch was depressed to the PB receiver 107 (step S64). On the other hand, if the PB receiver 107 is not available, the control unit 109 controls the switch circuit network 111 and connects the extension telephone whose PB calling switch was depressed to the notice sound generation unit 183, thereby transmitting a notice sound to the extension telephone whose PB calling switch was depressed (step S65).

In the construction shown in FIG. 3, one PB receiver has been provided. However, in the case of providing a plurality of PB receivers, the control unit 109 checks to see if any one of the plurality of PB receivers is available or not. Then, the control unit 109 connects the extension telephone whose PB calling switch was depressed to either one of the available PB receivers. On the other hand, if all of the PB receivers are busy, the extension telephone whose PB calling switch was depressed is connected to the notice sound generation unit 183.

In step S64, in the case where the PB receiver was connected, the control unit 109 checks to see if a PB signal is received by the PB receiver 107 or not (step S66). If the PB signal has been received, the frequency of the received PB signal is analyzed to see if to which dial number the received PB signal corresponds (step S67). The control unit 109 sends the dial number as a result of the analysis to the extension telephone whose PB calling switch was depressed through the sub-CPU of the extension circuit and is displayed on the display unit 203 of the extension telephone. Therefore, the operator can confirm whether the correct number has been called or not. Further, the control unit 109 checks to see if the external lines 162 and 172 are of the DP line type or not (step S69). In accordance with the result of the discrimination, the DP transmission unit or PB signal transmission unit in the trunk circuit is selected and the dial number is sent to the external line selected by the external line selecting button (steps S70 and S71). After the dial number is transmitted, the control unit 109 controls the switch circuit network 111 and switches the partner to which the extension telephone whose PB calling switch was depressed is connected from the PB receiver 107 to the selected external line (step S72). At this time point, the PB receiver 107 can be connected to another extension telephone.

On the other hand, in step S61, in the case where the calling was executed from the ten keys in the operation unit 202 of the extension telephone, the CPU 201 displays the dial number on the display unit in accordance with the depression of the ten-key and, further, sends the dial number as a code to the control unit 109 through the sub CPU in the extension circuit of the main unit 101. The control unit 109 calls in steps subsequent to step S69 in accordance with the received code.

In this embodiment, even after the PB calling switch was depressed and the extension telephone was connected to the PB receiver 107, if the dial number has been input from the ten keys in step S61 before the PB signal is received by the PB receiver 107 in step S66, the calling is executed in response to the ten-key input. Therefore, even in the case where the operator is not aware of the fact that he erroneously depressed the PB calling switch, it is possible to call by the ten-key input without causing the erroneous operation.

Third embodiment

Figure 7:
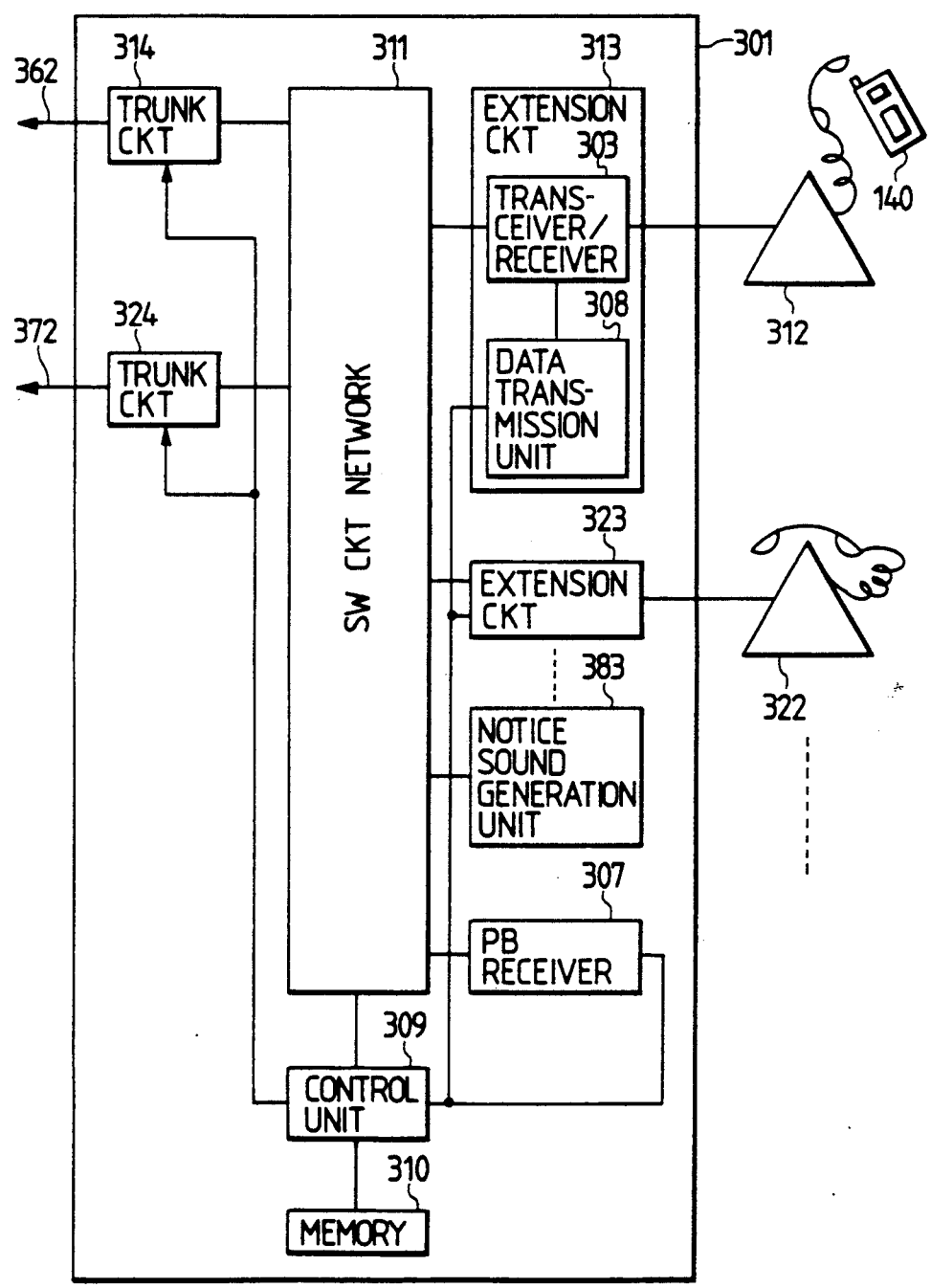
FIG. 7 is a block diagram of a main unit in the third embodiment of the invention.

FIG. 7 is a block diagram showing a system construction of the third embodiment of the invention. Reference numeral 301 denotes a main unit; 312 and 322 indicate extension telephones; 311 a switch circuit network; 314 and 324 trunk circuits; and 362 and 372 external lines. Reference numeral 309 denotes a control unit to control each section in the main unit 301 on the basis of data in a memory 310. Reference numeral 313 represents an extension circuit having a transceiver/receiver 303 and a data transmission unit 308.

Figure 8:
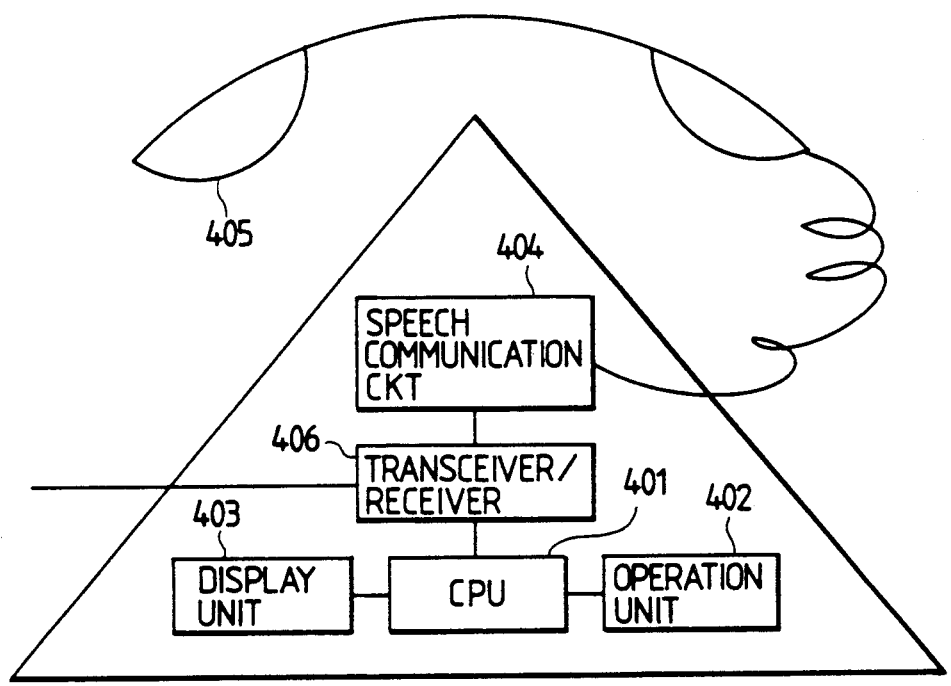
FIG. 8 is a block diagram of an extension telephone in the third embodiment of the invention.

FIG. 8 is a block diagram showing a construction of the extension telephone in the embodiment. Reference numeral 401 denotes a CPU for controlling a display unit 403 in accordance with an input from an operation unit 402 and for sending a control signal to a transceiver/receiver 406. Reference numeral 404 denotes a speech communication circuit for encoding a voice sound which was input from a speech transmission unit 405 and sending to the transceiver/receiver 406.

Figure 9:
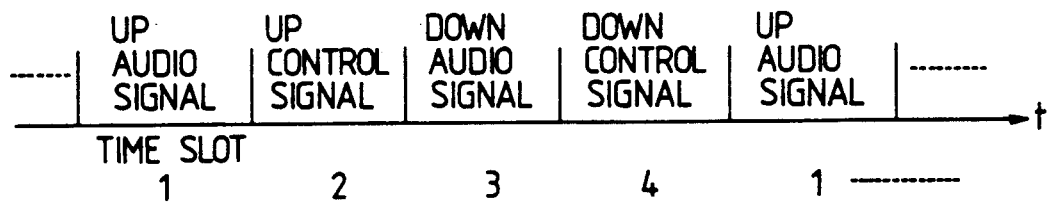
FIG. 9 is a timing chart of a signal between the main unit and the extension telephone in the invention.

FIG. 9 shows a time chart for the data communication between the transceiver/receiver 303 of the extension circuit 313 in the main unit 301 and the transceiver/receiver 406 of the extension telephone. That is, in the first time slot, the transceiver/ receiver 406 of the extension telephone encodes the voice sound from the speech communication circuit 404 and sends it to the transceiver/receiver 303 of the main unit 301, while the transceiver/receiver 303 sends the received voice sound to the switch circuit network 311. Next, in the second time slot, the transceiver/receiver 406 of the extension telephone sends the code corresponding to the operation of the operation unit 402 which was input from the CPU 401, while the transceiver/receiver 303 sends the received code to the control unit 309 through the data transmission unit 308. In the third time slot, the transceiver/ receiver 303 of the main unit 301 sends the voice sound received from the switch circuit network 311, while the transceiver/receiver 406 of the extension telephone decodes the received voice sound by the speech communication circuit 404. Finally, the transceiver/receiver 303 of the main unit 301 sends the control code received from the control unit 309 through the data transmission unit 308, while the transceiver/receiver 406 of the extension telephone sends the received control code to the CPU 401 and appropriately controls the display unit 403 or a bell or the like (not shown). After that, the processes in the first and subsequent time slots are repeated.

In this embodiment, a procedure to call by using the electronic apparatus 140 will now be described on the basis of the flowchart shown in FIG. 6. In step S62, the control unit 309 detects the depression of the PB calling switch in the second time slot for an up control signal. Further, in step S66, the control unit 309 checks to see if the dial number has been received or not in the first time slot for an up audio signal. In step S67, the dial number is analyzed. The subsequent operations are similar to those in the second embodiment.

Although the present invention has been described in detail above on the basis of the embodiments, the invention is not limited to the foregoing embodiments but many modifications and variations are possible within the spirit and scope of the appended claims of the invention.

What is claimed is:

1. A key telephone system comprising:
   a plurality of extension telephones; and
   a main unit,
   wherein said main unit has an extension interface for connecting said plurality of extension telephones,
   an external interface for connecting a plurality of external lines,
   switching means for connecting said plurality of extension telephones with said plurality of external lines,
   audio analyzing means for analyzing audio signals from said plurality of extension telephones,
   data analyzing means for analyzing data signals from said plurality of extension telephones, and
   calling means for sending a calling signal to one of said plurality of external lines in accordance with results of analysis of said audio and data analyzing means,
   wherein said switching means connects one of said extension telephones which outputs the audio or data signal with the one of said external lines to which said calling means sent the calling signal.

2. A system according to claim 1, wherein said calling means generates a dial pulse.

3. A system according to claim 1, wherein when a calling request from said extension telephone is detected, said main unit connects the extension telephone and said audio analyzing means.

4. A system according to claim 1, wherein said audio analyzing means analyzes the audio signal input from said extension telephone.

5. A system according to claim 1, wherein said extension telephone generates a signal in accordance with a key operation, and said data analyzing means analyzes a control signal from said extension telephone.

6. A key telephone system comprising:
   an electronic apparatus which can store a telephone number and from which the stored telephone number can be read out and used at any time;
   an extension telephone;
   a main unit;
   receiving means for receiving information generated by said electronic apparatus;
   calling means for calling in accordance with the information received by said receiving means; and
   alarm means for generating an alarming when said receiving means does not receive the information within a predetermined period of time.

7. A system according to claim 6, wherein said electronic apparatus further can store additional valuable information such as a schedule and the like and can read out and use said additional valuable information at any time.

8. A system according to claim 6, wherein said receiving means receives a voice sound generated by said electronic apparatus.

9. A system according to claim 6, wherein said main unit includes said receiving means.

10. A system according to claim 6, wherein said main unit includes said calling means.

11. A system according to claim 6, wherein said calling means generates a dial pulse.

12. A system according to claim 6, wherein said main unit connects and disconnects said extension telephone and an external line.

13. A system according to claim 6, wherein, when a calling request from said extension telephone is detected, said main unit connects the extension telephone and said receiving means.

14. A system according to claim 9, wherein said receiving means receives the audio signal input from said extension telephone.

15. A system according to claim 6, wherein said main unit transmits and receives a control signal from/to said extension telephone.

16. A key telephone system comprising:
a plurality of extension telephones;
a main unit;
a first communication path for allowing said main unit to receive audio signals from said extension telephones; and
a second communication path for allowing said main unit to receive control signals from said extension telephone,
wherein said main unit has
first analyzing means for analyzing the audio signals received from said first communication path,
second analyzing means for analyzing the control signals received from said second communication path,
switching means for connecting said first communication path with selected one of external lines and said first analyzing means, and
calling means for calling in accordance with the results of the analysis performed by said first and second analyzing means,
wherein said switching means connects said first communication path with said first analyzing means when calling, and connects said first communication path with the external line after calling.

17. A system according to claim 16, wherein said main unit executes time division communication with said extension telephones,
and said first and second communication paths are different channels on a set of communication lines.

18. A system according to claim 16, wherein said calling means generates a dial pulse.

19. A system according to claim 16, when a calling request from said extension telephone is detected, said main unit connects the extension telephone which executed the calling request and said first analyzing means.

20. A key telephone system comprising:
a plurality of extension telephones;
a main unit;
an electronic apparatus in which information can be independently registered from said extension telephones,
wherein said main unit has first analyzing means for analyzing control signals generated by said extension telephones;
second analyzing means for analyzing the information generated by said electronic apparatus;
switching means for connecting said second analyzing means with one of said plurality of extension telephones;
calling means for calling in accordance with results of analysis performed by said first and second analyzing means; and alarm means for generating an alarm when a request for connection with said second analyzing means is sent from one of said plurality of extension telephones, to said one extension telephone which sent the request for connection, in a case where said second analyzing means is already occupied by another of said extension telephones.

21. A system according to claim 20, wherein said electronic apparatus further comprises:
memory means; and
inputting means for inputting a telephone number to said memory means.

22. A system according to claim 21, wherein said electronic apparatus further comprises:
selecting means for selecting a desired telephone number from a plurality of telephone numbers stored in said memory means; and
transmitting means for transmitting the telephone number selected by said selecting means to said extension telephone.

23. A system according to claim 20, wherein said electronic apparatus transmits the information in a state in which it is not electrically connected to said extension telephones.

24. A system according to claim 20, wherein, when a calling request from said extension telephone is detected, said main unit connects the extension telephone which executed the calling request and said second analyzing means.

25. A system according to claim 20, wherein said second analyzing means analyzes an audio signal generated by said electronic apparatus.

26. A system according to claim 19, wherein in the case where said first analyzing means has already been connected to another extension telephone, said main unit informs such a fact to the extension telephone which executed the calling request.

27. A key telephone system comprising:
an extension telephone;
first receiving means for receiving a dial number on the basis of a key operation of said extension telephone;
second receiving means for receiving a dial number from an apparatus which cannot be electrically connected to said extension telephones; and
calling means for calling in accordance with the dial number received by said first and second receiving means,
wherein said extension telephone has instructing means for instructing use of said second receiving means and said second receiving means is enabled when use of said second receiving means is instructed.

28. A system according to claim 27, wherein said second receiving means receives a voice sound.

29. A system according to claim 27, wherein said second calling means has analyzing means for analyzing the dial number received by said receiving means and calls in accordance with the result of the analysis of said analyzing means.

30. A system according to claim 29, wherein said calling means makes said analyzing means operative in accordance with the instruction by said instructing means.

31. A system according to claim 1, wherein said audio analyzing means includes a PB receiver.

32. A system according to claim 6, wherein said receiving means includes a PB receiver.

33. A system according to claim 6, wherein said alarm means sends an alarm sound to said extension telephone.

34. A system according to claim 6, wherein said extension telephone comprises catch means for catching a line, and said alarm means generates the alarm when said catch means does not receive the information within a predetermined period of time from the line catch of said catch means.

35. A system according to claim 6, wherein said alarm means generates the alarm when the information is not received within a predetermined period of time from when said extension telephone enters an off-hook state.

36. A system according to claim 16, wherein said first analyzing means includes a PB receiver.

37. A system according to claim 20, wherein said second analyzing means includes a PB receiver.

38. A system according to claim 20, wherein said alarm means sends an alarm sound through said switch means.

39. A system according to claim 27, wherein said second receiving means includes a PB receiver.

40. A key telephone system comprising:
a plurality of extension telephones;
switching means for outputting to an external line an audio signal which is input from one of said plurality of extension telephones through an audio path;
control analyzing means for analyzing a control signal which is input via one of said plurality of extension telephones through a control path;
call means for sending to the external line a call signal according to a result of analysis by said control analyzing means; and
audio analyzing means for analyzing the audio signal which is input from one of said plurality of extension telephones through the audio path,
wherein said call means further sends to the external line the call signal according to a result of analysis of said audio analyzing means.

41. A system according to claim 40, wherein said switching means sends the audio signal input from the external line to one of said plurality of extension telephones through the audio path.

42. A system according to claim 40, wherein a plurality of external lines are connected to said switching means.

43. A system according to claim 40, wherein said plurality of extension telephones generate the control signal according to a key operation.

44. A system according to claim 40, wherein said switching means outputs the audio signal to the external line to which the call signal is sent, and the audio signal is the audio signal input from said extension telephone which output the control signal.

45. A system according to claim 40, wherein said switching means outputs the audio signal to the external line to which the call signal is sent, and the audio signal is the audio signal input from said extension telephone which output the audio signal analyzed by said audio analyzing means.

46. A system according to claim 40, further comprising a main unit.

47. A system according to claim 46, wherein said main unit includes said switching means.

48. A system according to claim 46, wherein said main unit includes said control analyzing means.

49. A system according to claim 46, wherein said main unit includes said call means.

50. A system according to claim 46, wherein said main unit includes said audio analyzing means.

51. A system according to claim 40, wherein said audio analyzing means includes a PB receiver.

52. A system according to claim 6, wherein said extension telephone has operation means for inputting a dial number, and said alarm means does not generate the alarm when the dial number is input from said operation means within said predetermined period of time.

53. A system according to claim 16, wherein each of said plurality of extension telephones has operation means for inputting a dial number and generates the control signals according to said operation means.

54. A system according to claim 27, wherein said first receiving means is enabled irrespective of an instruction of said instructing means.

* * * * *

UNITED STATES PATENT AND TRADEMARK OFFICE
CERTIFICATE OF CORRECTION

PATENT NO. : 4,996,708
DATED : February 26, 1991
INVENTOR(S) : Katsuhiro Kakizawa                Page 1 of 3

It is certified that error appears in the above-identified patent and that said Letters Patent is hereby corrected as shown below:

AT [57] ABSTRACT

Line 7, "by" should read --of-- and
         "of" should read --by--.
Line 13, "KTs" should read --KTS--.

COLUMN 1

Line 14, "number," should read --number--.

COLUMN 2

Line 48, "meral denotes" should read --meral 7 denotes--.
Line 58, "the" should be deleted.

COLUMN 3

Line 36, "dial" should read --dialed--.

COLUMN 4

Line 21, "process There" should read --process. There--.
Line 25, "embodiment" should read --Embodiment--.
Line 27, "this" should read --the-- and
         "the" (second occurrence) should read --this--.
Line 33, "33" should read --133--.
Line 36, "32," should read --132,-- and
         "23" should read --123,--.
Line 37, "code" should read --codec--.
Line 44, "code" should read --codec--.
Line 47, "code" should read --codec-- and
         "digital," should read --digital--.

UNITED STATES PATENT AND TRADEMARK OFFICE
CERTIFICATE OF CORRECTION

PATENT NO. : 4,996,708
DATED : February 26, 1991
INVENTOR(S) : Katsuhiro Kakizawa It is certified that error appears in the above-identified patent and that said Letters Patent is hereby corrected as shown below:

<u>COLUMN 6</u>

Line 33, "if" should be deleted.
      Line 61, "sub CPU" should read --sub-CPU--.
      Line 67, "ten keys" should read --ten-key--.

<u>COLUMN 7</u>

Line 6, "embodiment" should read --Embodiment--.
      Line 26, "sending" should read --sent--.

<u>COLUMN 8</u>

Line 51, "alarming" should read --alarm--.

UNITED STATES PATENT AND TRADEMARK OFFICE
CERTIFICATE OF CORRECTION

PATENT NO. : 4,996,708
DATED : February 26, 1991
INVENTOR(S) : Katsuhiro Kakizawa It is certified that error appears in the above-identified patent and that said Letters Patent is hereby corrected as shown below:

COLUMN 10

Line 33, "wherein in" should read --wherein, in--.
Line 57, "second calling means" should read --calling means--.
Line 58, "receiving means" should read --second receiving means--.

Signed and Sealed this

Ninth Day of February, 1993

Attest:

STEPHEN G. KUNIN

*Attesting Officer* — Acting Commissioner of Patents and Trademarks